United States Patent

Hsu et al.

[11] Patent Number: 5,886,532
[45] Date of Patent: Mar. 23, 1999

[54] NANOMETER DISTANCE REGULATION USING ELECTROMECHANICAL POWER DISSIPATION

[75] Inventors: Julia W. P. Hsu; Mark Lee; Bascom S. Dearer, Jr., all of Charlottesville, Va.

[73] Assignee: UVA Patent Foundation, Charlottesville, Va.

[21] Appl. No.: 720,889

[22] Filed: Oct. 4, 1996

Related U.S. Application Data

[60] Provisional application No. 60/004,865 Oct. 4, 1995 and provisional application No. 60/011,886 Feb. 20, 1996.

[51] Int. Cl.[6] .......................... G01B 7/14; G01B 101/20; G01R 27/02; G01R 29/22
[52] U.S. Cl. .......................... 324/635; 324/633; 324/648; 324/652; 324/109
[58] Field of Search .................................. 324/457, 458, 324/633, 635, 648, 652, 653, 662, 680, 682, 109

[56] References Cited

U.S. PATENT DOCUMENTS

5,065,103  11/1991  Slinkman et al. ........................ 324/458
5,319,977   6/1994  Quate et al. ........................ 324/662 X
5,523,700   6/1996  Williams et al. ........................ 324/458

*Primary Examiner*—Glenn W. Brown
*Attorney, Agent, or Firm*—Sheldon H. Parker

[57] ABSTRACT

A convenient, non-optical method for scanning probe microscopy tip-to-sample distance control based on the impedance change in a shear-force dither piezo. This is accomplished by determining the tip-sample distance by measuring the impedance change in a shear-force piezo-member. A Wheatstone type bridge can be utilized to regulate the tip-sample separation. Alternatively, an electrical bridge, having an output, regulates the tip-sample separation relative to the bridge output by driving the piezo/tip with a sine wave and combining said sine wave with a phase-referenced wave of equal amplitude at a 180° phase shift. The electronic bridge detects impedance changes of about −100 dB across loads with impedance phases between −90° to +90. Power dissipation is determined by measuring changes in electric impedance that a dither piezo presents to an oscillator. The non-optical method of determining probe-to-sample distance of an oscillating scanning probe consists of changing the probe-to-sample distance of an oscillating scanning probe. The changes in the electro-mechanical power dissipation of the oscillating probe are then measured.

12 Claims, 9 Drawing Sheets

Fig. 9

NANOMETER DISTANCE REGULATION USING ELECTROMECHANICAL POWER DISSIPATION

This invention was sponsored in part by U.S. Government funding and the Government has certain rights in the invention.

RELATE BACK

This application claims priority based on provisional application 60/004,865 filed Oct. 4, 1995 and 60/011,886 filed Feb. 20, 1996.

BACKGROUND OF THE INVENTION

1. Field of the Invention

The instant invention discloses a non-optical shear-force feedback method to regulate tip-sample distance for all types of scanning probe miscroscopy. The feedback signal is derived from an electrical impedance change in a dithering piezoelectric element with attached scanning tip.

2. Brief Description of the Prior Art

Scanning probe microscopy (SPM) is used to map the minute scale surface topography of samples using feedback techniques to control a measurement probe at a fixed, user defined separation distance from the surface of the sample. By moving the relative lateral position of the probe and sample, and monitoring the change in feedback signal required to maintain a fixed local separation distance, the physical topography of the sample surface can be determined with resolution between 0.01 and 100 nm. Scanning force microscopes (SFM) also have extensive applications in sub-micron photo-lithography, electrical characterization, tribology, and atomic manipulation. Because the feedback distance regulation mechanism must provide accurate movement on an atomic length scale, a SPM system must have a highly sensitive and well-characterized probe-to-sample separation detection element.

Non-optical control of the distance between a scanning microscope probe tip and the surface of a sample provides numerous advantages, without the complications arising from unwanted optical interference and the requirement of precise optical alignment. The technique involves sensing the effects of surface damping on a vibrating probe by measuring the change in the AC electrical impedance of an electromechanical assembly consisting of a piezoelectric element and an attached scanning probe tip (piezo/tip), as the resonantly oscillating tip is brought within ~10 nm of a sample surface.

The Schering-style bridge has been used to balance out most of the piezo/tip impedance with the tip retracted. However, while the impedance of the piezo alone is almost purely capacitive, the impedance of the piezo/tip assembly at one of the tip's mechanical resonances acquires a significant real part. The frequency dependence of the piezo/tip impedance near a tip resonance does not correspond to any simple combination of resistors and capacitors. While this impedance can be balanced by a series RC at any particular resonant frequency, the frequency range and ultimate sensitivity of a passive RC bridge turns out to be inconveniently limited.

Two non-optical distance control methods have recently been developed specifically for near-field scanning optical microscopes (NSOM): (1) electron tunneling current and (2) detection of fiber tip dither amplitude with a quartz piezo-electric tuning fork. Vacuum electron tunneling is similar to scanning tunneling microscopy by utilizing the metal coating on the optical fiber as the tip electrode. Electron tunneling is established when the tip is brought very close to the surface (<1 nm). At this distance, the small electric current that results when an electron moves between the surface of a metal and the metallic probe is detected, through a thin separating layer of vacuum or air. The current drops exponentially with the probe-to-sample separation. This offers high enough sensitivity to achieve atomic scale resolution, but is strictly limited to probe and samples that are made of electrically conducting materials. While the tunneling current is extremely sensitive to distance, this feedback method requires the sample to be conducting and cannot be used for non-conductive probes or samples. This requirement significantly limits the power of this feedback method as applied to NSOM, which is an optical microscope and thus can be used to probe optical properties of any material.

Piezoelectric and piezoresistive sensors are used in some forms of SFM and NSOM. These techniques work by measuring the change in either voltage or resistance of a sensor mounted to the probe assembly, usually set in vibration, as the probe is deflected by the sample. The sensor required is typically a highly specialized, tuned piezoelectric or piezoresistive element. Typically a tapered fiber is glued on a high Q (quality factor) quartz tuning fork with resonance frequency of 32,768 Hz. The tip-sample interaction will change the Q of the tuning fork plus tip assembly. Therefore, measurement of the piezoelectric signal from the tuning fork can serve as a signal for distance control. Although this method has been shown to work reasonably well, there remain problems. The attachment of a quartz tuning fork and wires near the fiber tip can obscure collection for reflection NSOM imaging. In addition, the Q of commonly available quartz tuning forks is high (~1000), resulting in limited bandwidth and the need for slow scan rates. Similar to capacitance sensors, these methods normally require attachment of an additional transducer with at least two extra wires dedicated to the sensor, in addition to the voltage driving wires on the mechanical oscillator. The chief drawback of these techniques is their need for specially fabricated driving or sensing elements and their relatively limited frequency range of operation.

Optical scattering, deflections, and interferometry are used in many forms of SFM and NSOM. This method involves using light scattering to detect the change in deflection of a probe as the probe-to-sample distance changes. However, optical detection is frequently not useful or convenient in many situations because it requires high precision mechanical alignment of light source, probe, and light detector. This makes optical detection difficult to use, and it is particularly unreliable for use in hostile or unusual environments, such as high vacuum chambers, corrosive atmospheres, or low-temperature cryostats. Scientific and industrial studies of surface properties are often carried out under such conditions, and so can benefit greatly from adapting SFM and NSOM to work reliability in such environments. In addition, stray light from the optical detection systems make it undesirable for use with light-sensitive samples, which is a particular drawback for use with NSOM.

Capacitance sensors are used in some forms of SFM. This method measures the change in capacitance on a capacitance sensor mounted on the probe as the probe-to-sample distance changes. Capacitance sensing suffers from more limited sensitivity and requires the attachment of a specialized external sensing element, the capacitance transducer, and electrical leads onto the probe assembly. This greatly increases the complexity and decreases the design flexibility of the probe assembly while offering less sensitivity than other methods.

NSOM is a novel technique that achieves optical resolution higher than the diffraction limit by placing a subwavelength aperture less than a wavelength from a sample surface, i.e. in the near-field regime. The most commonly used subwavelength apertures are fabricated by tapering, and then metal-coating, optical fibers. The images formed with optical contrast are obtained by moving the aperture laterally relative to the sample, similar to other scanning microscopy techniques. The high spatial resolution arises from the interaction of evanescent waves, which exist only near the aperture and which decay rapidly away from the aperture. Since the evanescent modes contribute only in the near-field regime and show strong distance dependence, the aperture-sample distance regulation is essential for high resolution imaging and for the interpretation of near-field optical contrast. Furthermore, the metal (usually aluminum) coating used to define the NSOM aperture is soft, therefore distance regulation for NSOM must prevent physical contact between the fiber tip and the sample in order to prevent damage to the aperture. Typical operation for visible and near infrared light uses aperture sizes of 20 to 300 nm and sample-to-aperture (i.e. fiber tip) separation of 1 to 20 nm.

A shear-force mechanism has been widely adapted to regulate fiber tip-sample separation in NSOM. The tapered optical fiber is attached to a piezoelectric element (the dither piezo) and held vertically above the sample surface. At the end of the fiber is the subwavelength aperture. The tapered fiber tips are mechanical structures with lateral vibration normal modes of reasonably high quality factor (Q~30 to 100), analogous to a long rod held at one end. By applying a time-dependent (AC) voltage to the dither piezo at a selected resonant frequency, the fiber tip is set in vibration parallel to the sample surface. As the tip approaches the sample, the amplitude of this dithering motion decreases due to interaction with the sample. In other words, the Q of the mechanical system decreases. The prior art shear-force feedback involves detecting the tip dither amplitude and regulating tip-sample separation by maintaining a fixed user-defined dither amplitude.

The first two methods for shear-force distance control in NSOM were independently proposed by Betzig et. al. and Toledo-Crow et. al. Both methods are based on optical detection and require use of a second laser and photodetector in addition to what is needed for the NSOM imaging itself. The widely used method works by focusing the feedback laser onto the fiber tip and monitoring the AC component of the scattered light at the dither frequency. Although this optical method regulates distance well, the major disadvantage is that while the NSOM light from the subwavelength aperture is ~10 nW in power, the feedback laser power is typically $10^5$ times larger, roughly 1 mW. The optical excitations arising from the feedback laser can result in a large background signal and reduce the signal-to-noise (S/N) ratio for the near-field optical contrast. Through a careful selection of feedback laser wavelength and usage of proper filters, some of these problems can be minimized. However, to accomplish this, the feedback laser must then be sample specific. Further, optical feedback makes NSOM studies of narrow-bandgap semiconductors (bandgap$\leq$0.5 eV) and superconductors (superconducting gap$\leq$10 meV) impractical. In addition, crucial alignment of the feedback laser, fiber tip, and the photodetector makes it difficult to adapt optical detection methods for operation under non-ambient conditions, e.g. at low temperature or in ultra-high vacuum. Thus, a non-optical method for tip-sample distance control is desirable.

The instant invention discloses a probe-to-sample separation detection method based on monitoring changes in the electromechanical power dissipation of an oscillating probe as the probe-to-sample distance is changed. While maintaining the sensitivity of the prior art, the instant method provides significantly greater simplicity and a wider range of applicability.

SUMMARY OF THE INVENTION

The instant invention discloses a convenient, non-optical method for scanning probe microscopy tip-to-sample distance control based on the impedance change in a shear-force dither piezo. A nonoptical distance control is a significant advance in NSOM because of the elimination of possible spurious optical signal arising from the feedback laser. The sensitivity of the impedance change feedback technique is comparable to, or better than, current optical detection methods. The instant method is easier to adapt and is more flexible than other non-optical feedback methods. In particular, the impedance change feedback method will greatly simplify NSOM operation in non-ambient situations, such as low temperatures or vacuums.

The disclosed method of regulating tip-sample distance in scanning probe microscopy is accomplished by determining the tip-sample distance by measuring a property which relates to power dissipation, as for example, the impedance change in a shear-force piezo-member. A Wheatstone type bridge can be utilized to regulate the tip-sample separation. Alternatively, an electrical bridge may also be used to regulate the tip-sample separation by driving the piezo/tip with an oscillating wave, such as a sine wave and combining said sine wave with a phase-referenced wave of equal amplitude at a 180° phase shift. The electronic bridge detects impedance changes of about −100 dB across loads with impedance phases between −90° to +90. Power dissipation is determined by measuring changes in electric impedance that a dither piezo presents to an oscillator.

The non-optical method of determining probe-to-sample distance of an oscillating scanning probe, consists of changing the probe-to-sample distance of an oscillating scanning probe. The changes in the electromechanical power dissipation of the oscillating probe are then measured. The measured value correlates directly with probe-to-sample distance.

BRIEF DESCRIPTION OF THE DRAWINGS

The advantages of the instant disclosure will become more apparent when read with the specification and the drawings, wherein:

FIGS. 5(a) and 5(b) are 6.25 $\mu$m×6.25 $\mu$m topographic images of the same area of a compositionally graded, related GeSi film taken with (a) optical feedback and (b) non-optical impedance shear force feedback.

DETAILED DESCRIPTION OF THE INVENTION

Figure 3:
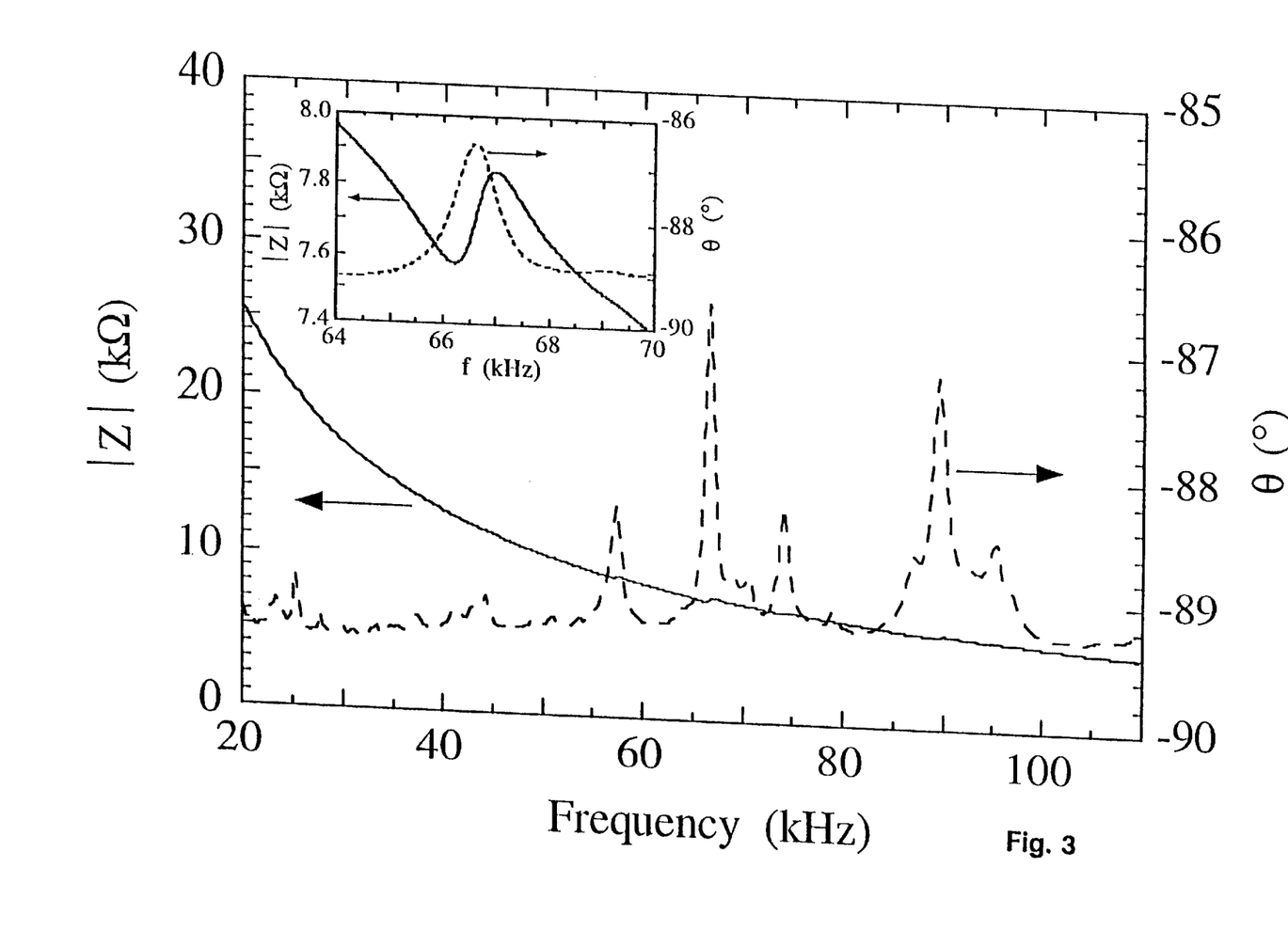
FIG. 3 is a graph depicting the magnitude (|Z|) and phase (θ) from 20 kHz to 110 kHz of dither piezo impedance with a fiber tip mounted on it. The inset shows a close up of the resonance near 66.6 kHz.

The instant invention discloses a simple, sensitive, non-optical method for scanning probe microscopy tip-sample separation control. While this method was developed for use in NSOM, its applicability extends to all types of scanning probe microscopes. In accordance with the instant invention, a fiber tip attached to a dither piezo forms an electromechanical system with complicated mechanical resonance structures. At a resonance, the system draws more power from the voltage oscillator because of the amplified movement of the mechanical components (e.g. the tip). The amount of power consumption on resonance is directly proportional to Q, and thus is sensitive to the change in damping force as the tip approaches and interacts with the sample surface. At the frequencies of interest (10–100 kHz), the change in power consumption is best manifested by a change in the electrical impedance that the dither piezo presents to the oscillator. The dither piezo impedance is mostly capacitive, but becomes slightly more resistive at each mechanical resonance (FIG. 3).

Figure 1:
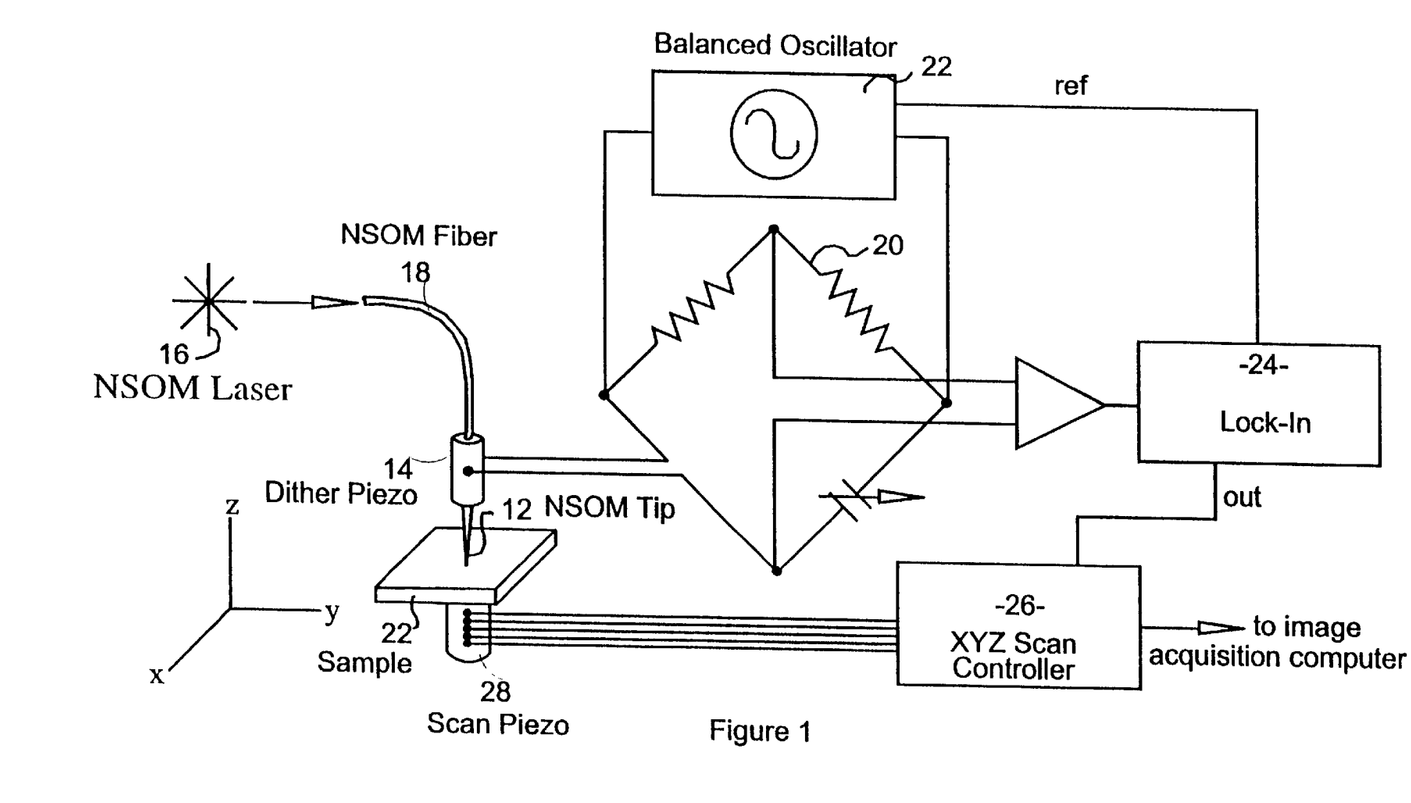
FIG. 1 is a block diagram depiction of an example of the NSOM setup with Wheatstone Bridge impedance detection for tip-sample distance control.

The new probe-to-sample separation measurement and regulation comprising this invention consists of applying a small amplitude mechanical oscillation from the laser 16 through the fiber 18 to the probe at a frequency close to a mechanical resonance of the probe assembly comprising a dither piezo 14 and a tip 12. The distance between the probe and sample 22 is then detected by measuring a quantity proportional to the electromechanical power dissipation in the oscillating probe assembly as the probe-to-sample distance is changed. FIG. 1 shows a block diagram of one example of a typical system, using a standard Wheatstone Bridge 20, oscillator 22, lock-in 24 and scan controller 26. The probe can be any of a variety of tapered "tips" 12 rigidly attached to a single dither piezoelectric element 14 that converts an electrical voltage oscillation into a mechanical vibration. The feedback is then received by the scan piezo 28.

Figure 2:
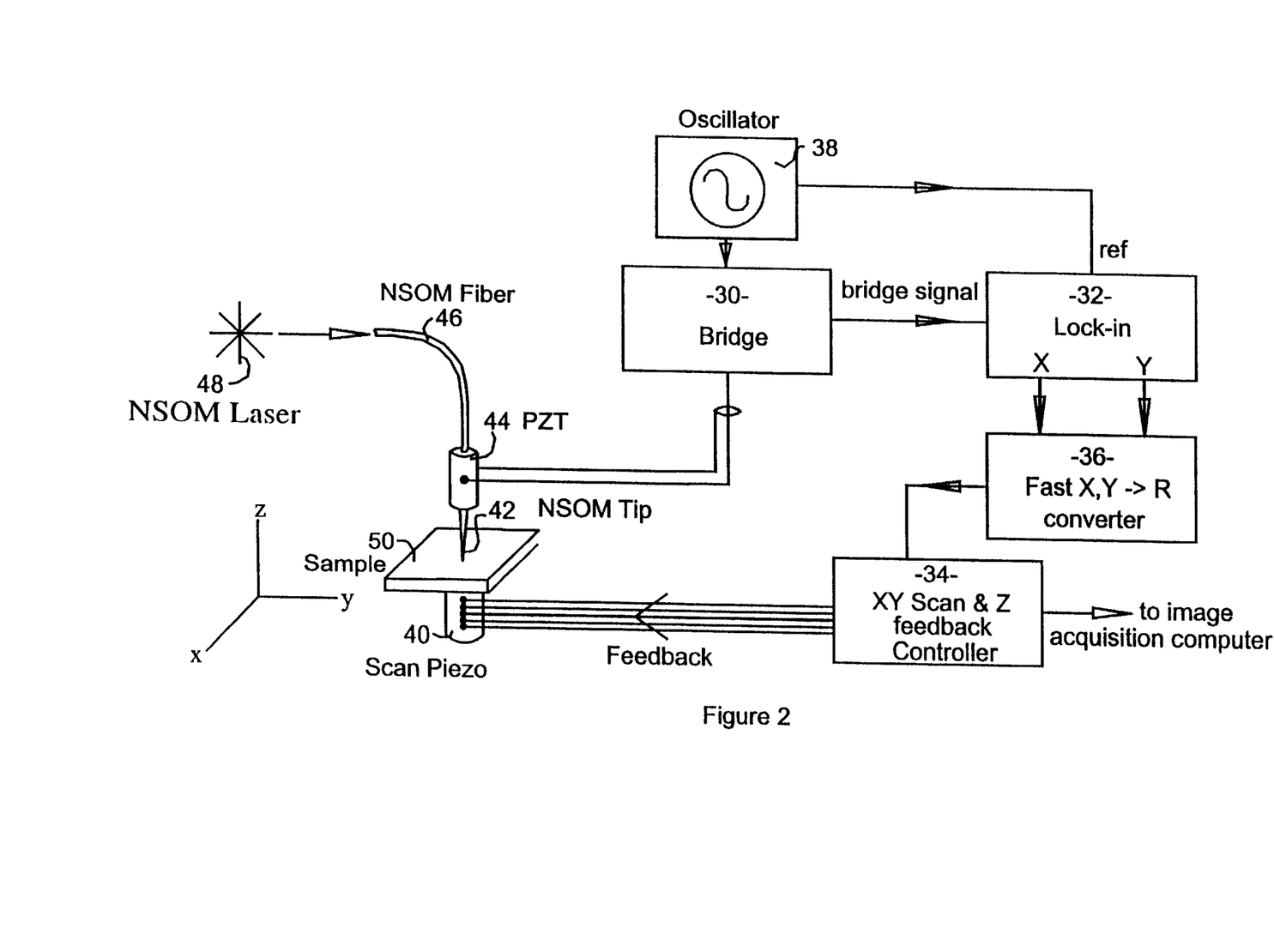
FIG. 2 is a block diagram of an alternate embodiment of the non-optical impedance-change feedback system implemented in a near-field scanning optical microscope.

FIG. 2 is a block diagram of an alternate complete shear-force feedback system for the NSOM, utilizing the disclosed arbitrary impedance bridge 30 and wide-bandwidth magnitude conversion circuit. In addition to the impedance bridge 30, the feedback system includes an oscillator 38, lock-in 32, and fast converter 36. The feedback is received by the scan piezo 40. The distance between the sample 50 and the probe, comprising the PZT 44 and tip 42, is detected by measuring the power dissipation, as described heretofore. As described in FIG. 1, the amplitude is applied through the fiber 46 from the laser 48. This system is another example and other systems will be known to those skilled in the art when incorporated with the instant disclosure. For a lock-in amplifier 32, both a Stanford Research Systems SR830 and an EG&G 7260 have provided equal success. The XYZ scan controller 34, which includes the Z feedback electronics, is a Park Scientific Instruments BD-2 scanning force microscope controller modified for NSOM applications. It is important to emphasize that all external electronics must be fast enough so that the feedback loop time constant set by the scan controller 34 is the limiting factor in determining the bandwidth of the entire feedback system.

When the vibration frequency is at or near the mechanical resonance frequency of the probe assembly, short-range (0.01 nm to 100 nm) probe-to-sample interactions will cause a change in the power dissipated by the oscillating probe as the probe-to-sample distance is changed. Therefore, by measuring a signal proportional to the power dissipated by the oscillating probe, the probe-to-sample distance can be measured and the information used to maintain a user-defined constant probe-to-sample distance by conventional feedback regulation techniques. As an example, the mechanical oscillation can be induced by applying a sinusoidal voltage to the piezoelectric element. The change in power dissipated as the probe-to-sample distance is decreased, results in a decrease in power output from the voltage oscillation source. In the case of a constant voltage amplitude oscillator, the time averaged power output by an electrical oscillator is:

$$<P> = <Re(V(t)I(t))> = \frac{1}{2} V_o^2 \frac{Re(Z)}{|Z|^2}$$

where $V(t)=V_o \cos(2\pi f_o t)$ is the voltage oscillation being output by the electrical oscillator (at frequency $f_o$), I(t) is the corresponding current oscillation being output, Re(. . .) indicates the real part of a quantity (i.e. the part in phase with V(t)), the brackets indicate a time average over many oscillation periods, Z is the complex electrical impedance of the probe assembly, and Re(Z) is the real part of the impedance (i.e. the resistance). Different power formulas will apply depending on the exact nature of the electrical oscillator. In this example, measurement of changes in any physical quantity related to either I(t) and/or Z as the probe-to-sample distance changes will yield information on the separation. Such quantities include, but are not limited to, the electric current amplitude and phase (relative to the voltage oscillation) being output by the voltage oscillation source, the electrical impedance (resistance and reactance) of the probe assembly being driven by the voltage oscillation source, the electrical reflection coefficient of the probe assembly, as well as other quantities. The most convenient quantity to measure for a given application depends upon factors such as the frequency range, desired sensitivity, minimum required response time, etc.

FIG. 3 shows the frequency dependence of the impedance magnitude (|Z|) and phase (θ), taken with a HP 4194A impedance analyzer, for a lead-zirconate-titanate (PZT) tube dither piezo with a tapered NSOM tip mounted on it. The dither piezo used is ⅛" OD, ⅛" long with a 0.020" wall thickness. The tip is far away from the sample surface. The spectrum is very sensitive to how and where the tip is mounted, but is stable if the mechanical setup is not altered. As shown, |Z| displays a characteristic frequency dependence ($1/\omega$) for an RC circuit and $\theta$ has a nearly constant off-resonance background value of ~−89°. At a resonance, $|Z|$ increases by a few percent while $\theta$ increases by a few degrees from the off-resonance background, indicating that the resistive (dissipative) part of impedance is higher. By focusing a laser on the tip and detecting the scattered light, it has been verified that the tip oscillates resonantly (yielding a non-zero AC optical signal) at each frequency where $\theta$ exhibits a peak, i.e. at resonant frequencies of the electromechanical system.

At a resonant frequency, when the tip is brought near the surface, the additional damping due to tip-sample interaction causes changes in $|Z|$ and $\theta$ due to a decrease in Q. On resonance, as the tip approaches the sample surface, a decrease in $|Z|$ of a few parts in $10^3$ to $10^4$ from the graph in FIG. 3, was observed, while the change in $\theta$ is an order of magnitude smaller. This change in $|Z|$, which is sensitive to the damping of the electromechanical system, is used for tip-sample distance feedback control.

Because the change in $|Z|$ of interest is on the order 0.1% to 0.01%, a bridge is used to null out $|Z|$ when the tip is far away from the sample surface. When the tip begins to interact with the sample, the bridge becomes unbalanced and the bridge output is used to regulate tip-sample separation. The simple Wheatstone-type bridge, illustrated herein in FIG. 1, is one example of a prior art bridge that works well with good noise performance. Its sensitivity is limited only by the Johnson noise of the resistors in the bridge (6.5 $nV/(Hz)^{1/2}$). However, on resonance, the impedance of the dither piezo is not easily represented by any simple combination of conventional circuit elements. Thus, the Wheatstone bridge cannot be completely balanced on resonance. The best which has been achieved with this simple bridge is to null out 98% of the signal on resonance. Off-resonance, the bridge can be balanced 5 to 10 times better, therefore detecting $10^{-2}$ of the unbalanced bridge signal on the lock-in amplifier. The change in impedance between having the tip far away from the sample and contacting the sample shows up as a 1–10% change of the bridge output. This can be detected easily with a lock-in amplifier, limited only by the white noise in the measurement bandwidth.

Figure 4:
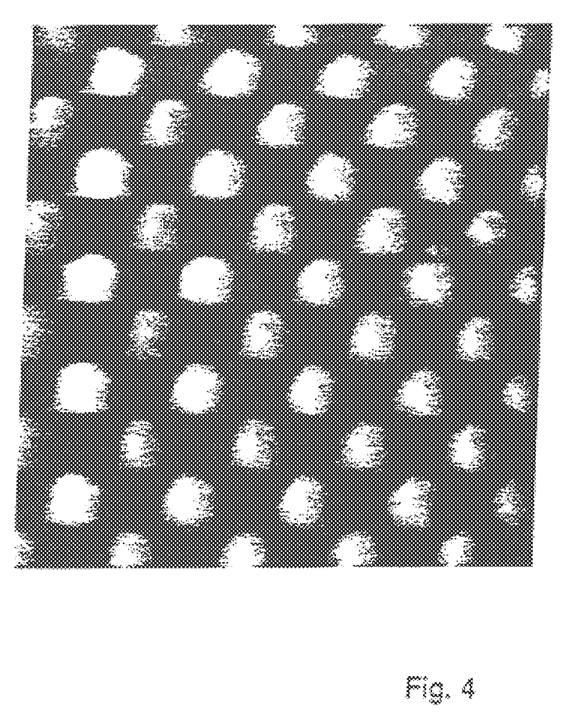
FIG. 4 is a 7 $\mu$m×7 $\mu$m topographic image of a grating taken with non-optical impedance shear force feedback. The full gray scale in z represents 1250 Å.

FIG. 4 shows a shear-force image of a 2-dimensional Au-coated grading taken with the nonoptical impedance change feedback, and using the Wheatstone Bridge. The image (256 pixel×256 pixel) size is ($7 \mu m$)×($7 \mu m$) and the full gray scale for z represents 1250 Å. The scan rate was 0.25 Hz/line, which is a typical rate for scans using optical detection of shear-force feedback. It is evident that the impedance feedback is responsive enough to track the large morphology changes in the grading. FIGS. 5(a) and (b) show shear force topographic images of a compositionally-graded, relaxed GeSi alloy film. FIG. 5(a) is taken with prior art optical detection feedback and 5(b) with non-optical impedance change feedback. The image size is ($6.25 \mu m$)× ($6.25 \mu m$) and the full gray scale for z represents 100 Å. The scan rate was 0.5 Hz/line for this sample, as the topographic features are smaller than those of the grading in FIG. 4. No image processing other than a background subtraction was performed on either image. The same lock-in amplifier was used with the same time constant and the same gain and time constant on the feedback loop for both images. As illustrated, the two images are identical, except that the image taken with optical feedback (FIG. 5(a)) is slightly noisier. This was more easily seen on the oscilloscope trace during data acquisition. Since the noise level of the impedance change feedback is much lower, the lock-in time constant can be reduced further and the scan rate can be increased. This sample has been imaged at 1 Hz/line scan without losing resolution in topography and without damaging the tip.

FIG. 5 plots the bridge output (black squares), which is proportional to the impedance change of the dither piezo, and the optically detected signal (crossed squares) as the tip approaches the sample surface. The voltage applied across the bridge was 0.1 $V_{rms}$, and the frequency of operation was 66.6 kHz. When balanced, the voltage across the dither piezo was ~0.05 $V_{rms}$. The two approach curves have the same functional form, indicating that the mechanism responsible for the changes observed by the two detection methods is the same. Therefore, the impedance detection, which measures the changes in the electromechanical system, is indeed sensitive to the tip-sample interaction.

Figure 6:
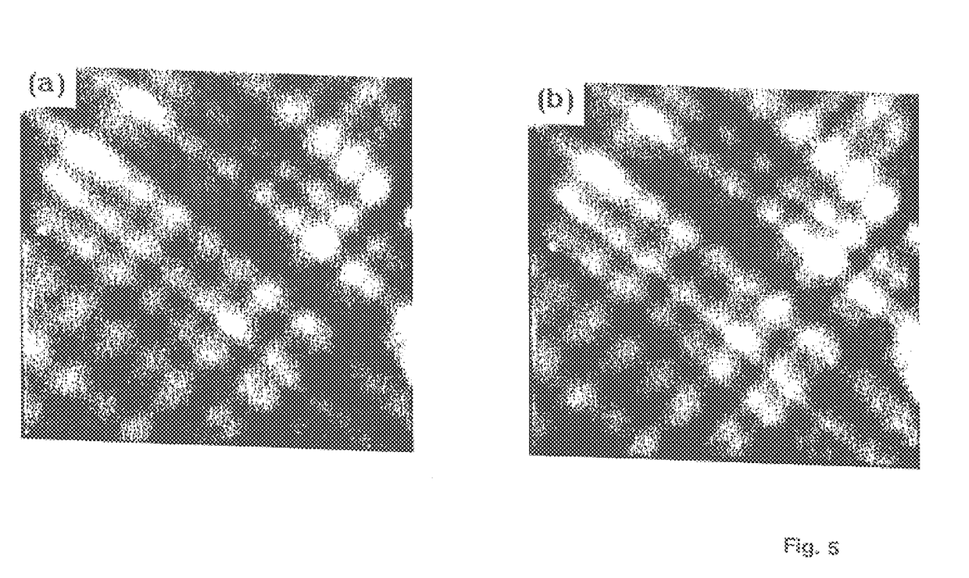
FIG. 6 is a graph illustrating bridge output signal (black squares, left axis), which is proportional to impedance change and photodiode signal from optical detection of tip dither amplitude (crossed squares, right axis) as a function of tip-sample separation.

Typically 0.1 $V_{rms}$ is applied across the bridge; only half of this voltage is across the dither piezo when on balance. This driving voltage corresponds to the piezo moving 0.08 nm. Based on the measured Q (30–100) and treating the tip as a driven, weakly-damped, simple harmonic oscillator, the lateral movement of the tip on resonance, far away from the surface, is estimated to be a few nm. Varying the drive voltage from 0.05 $V_{rms}$ to 1 $V_{rms}$, a linear increase in the signal was measured. Higher voltage is not desirable because the tip movement would be too large, resulting in degradation of resolution. As the tip approaches the surface, the tip-sample interaction decreases the tip movement, proportional to the decrease in Q. Thus, during actual NSOM measurements, the dithering motion of the tip is smaller than when the tip is far away from the sample, as confirmed by the decrease in the optically detected AC signal illustrated in FIG. 6.

As stated above, the sensitivity of this impedance feedback method is limited by the noise floor in the measurement bandwidth. Typically a 10 $nV/(Hz)^{1/2}$ noise floor, with the two major contributions being the bridge resistor Johnson noise (6.5 $nV/(Hz)^{1/2}$) and the lock-in amplifier noise (8 $nV/(Hz)^{1/2}$) is observed. For a 1 kHz bandwidth, the measurement noise is 0.3 $\mu V$. The channel in bridge output signal, between having the tip far away and in contact, is typically 30 to 100 $\mu V$. Therefore, the sensitivity is 0.3 to 1%. For an approach curve of 50 Å, as shown in FIG. 5, this corresponds to sensitivity in z of better than 0.5 Å. Higher sensitivity can be achieved with a smaller measurement bandwidth at the expense of a slower scan rate.

Using the driven, weakly-damped, simple harmonic oscillator model and knowing the static displacement of the dither piezo, the force can be estimated if the spring constant (k) of the mechanical system is known. For the tapered fiber tips of ~2 mm force length, k is ~100 N/m, yielding an estimated force ~1 to 10 nN. On resonance, the damping force equals the driving force. As the tip approaches the surface, the damping force due to tip-sample interaction becomes an increasing fraction of the total damping force, proportional to the change in either the optical signal or the impedance. Typically imaging is done using 100 pN to 1 nN.

In order to increase ease of use and dynamic range while decreasing susceptibility to stray capacitance, an arbitrary-impedance bridge was designed. The arbitrary-impedance bridge maximizes detection sensitivity of the surface damping-induced impedance change as the tip approaches and interacts with the sample. Changes in the electromechanical system are used to produce nanometer distance feedback. In addition, an auxiliary circuit greatly improves reliability by making the feedback signal insensitive to the phase of the impedance change. The complete detection network can sense changes of −80 to −100 dB down to the level of 1 μV in a bandwidth of >1 kHz. The feedback system has demonstrated topographic height sensitivity of ~0.5 Å and dynamic range of >60 dB.

Since the impedance change is about 1 part in $10^4$, a bridge is needed to balance out most of the piezo/tip impedance with the tip retracted. However, while the impedance of the dither piezo alone is almost purely capacitive, the impedance of the piezo/tip assembly at one of the tip's mechanical resonances acquires a significant real part. The frequency dependence of the piezo/tip impedance near a tip resonance does not correspond to any simple combination of resistors and capacitors. While this impedance can be balanced by a series RC at any particular resonant frequency, the frequency range and ultimate sensitivity of a passive RC bridge turns out to be inconveniently limited. The disclosed arbitrary impedance bridge detects the small change in AC electrical impedance of an electromechanical piezo/tip assembly with high accuracy and stability. The wide-bandwidth magnitude conversion circuit removes the phase sensitivity, making the system more predictable. These elements increase the practicality and reliability of the non-optical impedance detection method for scanning probe microscopy. Having implemented this feedback control in near-field scanning optical microscopy, allows the user to routinely approach and scan without any auxiliary optical guidance. Although the disclosed electronic bridge does not result in noise reduction over the Wheatstone Bridge, the electronic bridge is much easier to use with a larger dynamic range.

Although the drawings heretofore utilize the Wheatstone Bridge, the scans taken with the disclosed electronic bridge produce the same results.

The feedback system begins with a simple circuit capable of balancing an arbitrary AC impedance to high precision and detecting changes from that balance with high sensitivity, even if the impedance cannot be modeled by any standard RLC network. Compared to a passive bridge, this circuit is useful over a larger range of frequencies and impedance magnitudes, and is relatively immune to stray capacitances. The bridge drives the piezo/tip load with an oscillating wave, such as a sine wave, combining it with a phase-referenced wave of equal amplitude but 180° phase shift. The principal is similar to that of an auto-null bridge, except that the auto-nulling feedback loop has been opened to create an accessible null signal. This bridge can be used to detect impedance changes of order −100 dB across loads whose impedance phases range between −90° (capacitive) to +90° (inductive). The disclosed bridge circuit is optimized for the mostly capacitive reactances of the piezos used in scanning probe microscopes.

Figure 7:
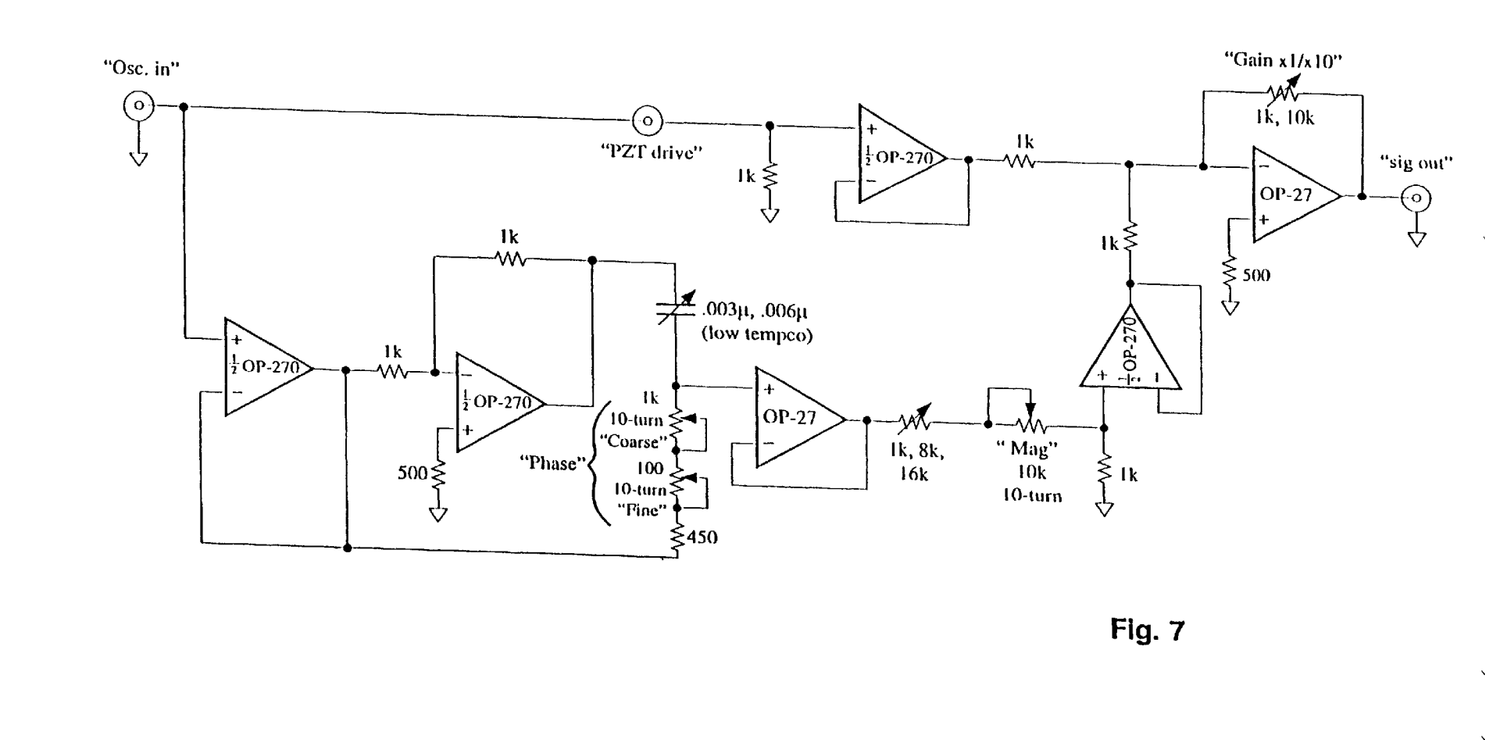
FIG. 7 is a schematic of the arbitrary impedance bridge circuit using component values chosen for optimal performance of the near-field scanning optical microscope utilized.

The circuit schematic is shown in FIG. 7 using component values which were chosen for optimal performance with the PZT tube used in the NSOM and the frequency range of the fiber optic tip resonances. Other values which provide optimal performance will be apparent to those skilled in the art. A signal generator drives the "Osc. In" and is split between driving the piezo/tip assembly and a buffered phase shifter. The phase shifter drives a resistive voltage divider, whose output is summed with the signal across the piezo/tip assembly at the output buffer. The output is monitored with a dual-phase digital lock-in amplifier. With the tip fully retracted, the "phase" and "magnitude" pots are adjusted to generate a signal equal in magnitude but opposite in phase to the signal across the piezo/tip assembly, thereby nulling the output to $\leq 1$ μV. Above 10 kHz, the poor frequency performance of the wirewound pots forces an iterative approach to minimizing the output. First the output signal is minimized using the magnitude pot, then re-minimized using the phase. This procedure is repeated until the desired minimum (near zero) is reached at the output. This typically takes 2 to 3 iterations.

The circuit components listed were chosen to operate with the piezo/tip assemblies used in a NSOM using a PZT tube made of EBL#2 material with dimensions ⅛" o.d., ⅛" length, and 0.01" wall. Piezo tubes made of different materials and non-tubular piezo elements were also tested, resulting in similar performance. The drive frequency is chosen to be at a fundamental vibrational mode of the free end of the tip (not of the piezo itself), usually between 30 and 100 kHz. The impedance magnitudes in this frequency range for the piezo/tip assembly are between 5 and 20 kΩ. The impedance phase on a tip resonance is usually between −75° and −89° so the phase shifter components were chosen to generate a compensating wave with adjustable phase between +45° to +135° at 80 kHz. The PZT is driven with 0.05 to 0.1 $V_{rms}$, and the bridge output magnitude can be nulled to better than 1 $\mu V_{rms}$, limited only by the resolution of the pots and the noise in the lock-in bandwidth of $\leq 1$ kHz. Both phase shifter and magnitude component values represent a compromise between useful frequency and magnitude ranges and ultimate sensitivity. It should be understood that the ranges disclosed have been selected for optimal performance of the equipment, rather than by way of indicating limits of the invention.

After nulling the bridge with the tip retracted, the full-scale magnitude change in the bridge output when the tip approaches and touches the sample is typically 50 to 100 μV. During image acquisition, the tip-to-sample distance is regulated by using feedback control to maintain a bridge output signal of 10 to 20 μV.

Feedback stability during image acquisition requires a lock-in time constant $\leq 0.3$ ms, and at a line scan rate of 0.25 Hz, an image may take as long as 15 min. to acquire. Hence, careful construction techniques and choice of op-amps are required to minimize noise and drift. All signal input and output lines are shielded. Low temperature-coefficient components are used throughout. It is particularly important that the capacitor in the phase shift network not drift. The output noise background was measured to be 18 n $V/Hz_{1/2}$ in the operating frequency range, and drift was measured to be <1 μV over 30 minutes in ambient temperature operation. The noise was sufficiently low to allow use of a lock-in time constant as small as 10 μs and line scan rates up to 1 Hz with no image degradation. The practical scan rate for a given sample obviously depends on the scan size and the topography of the sample.

With the scanning tip retracted from the sample surface, the bridge is usually balanced so that the residual bridge output signal is $\leq 1$ μV, at which point the signal phase on the lock-in becomes undefined. As the tip approaches the sample for the first time, the bridge output magnitude increases because of a change in the electrical impedance of the piezo/tip assembly. The phase of this impedance change is not known beforehand since this phase depends on variables such as the precise initial bridge imbalance, the mechanical characteristics of a given tip, and the sample surface conditions. The phase is not easily controllable or predictable. The approach signal thus appears in some combination of the X and Y channels of the lock-in. After a single successful approach, the impedance phase is known and the lock-in reference can be set so that the bridge signal appears entirely in the X channel on all subsequent approaches. However, this is not possible for the initial approach of a given tip to a given sample. Thus, one technical difficulty in implementing a reliable non-optical feedback method is this inability to predict in which channel the bridge signal will appear on the first approach. This problem can be circumvented by using auxiliary optical scattering methods, known in the art, to monitor the tip vibration on the initial approach, but such a procedure subverts the freedom of the non-optical feedback sensor from the rigors of optical alignment.

It is clearly more reliable to have a distance control signal independent of the phase of the lock-in reference, i.e. something proportional to the magnitude of the bridge signal. In principle this is possible on a digital lock-in by using the computed magnitude (R) output option. Unfortunately, the R output of common dual-phase lock-ins is digitally updated at only 200 to 256 Hz, compared to X and Y channel update rates of $\geq 100$ kHz. The very small resulting R channel bandwidth degrades the response speed of the feedback loop, leading to oscillatory instabilities when attempting to feedback using R from the lock-in output. Rather than use a lock-in, a variety of phase-insensitive rms meters are available, although no prior art meters have the required 1 $\mu$V sensitivity in a >1 kHz bandwidth needed for stable feedback operation.

Figure 8:
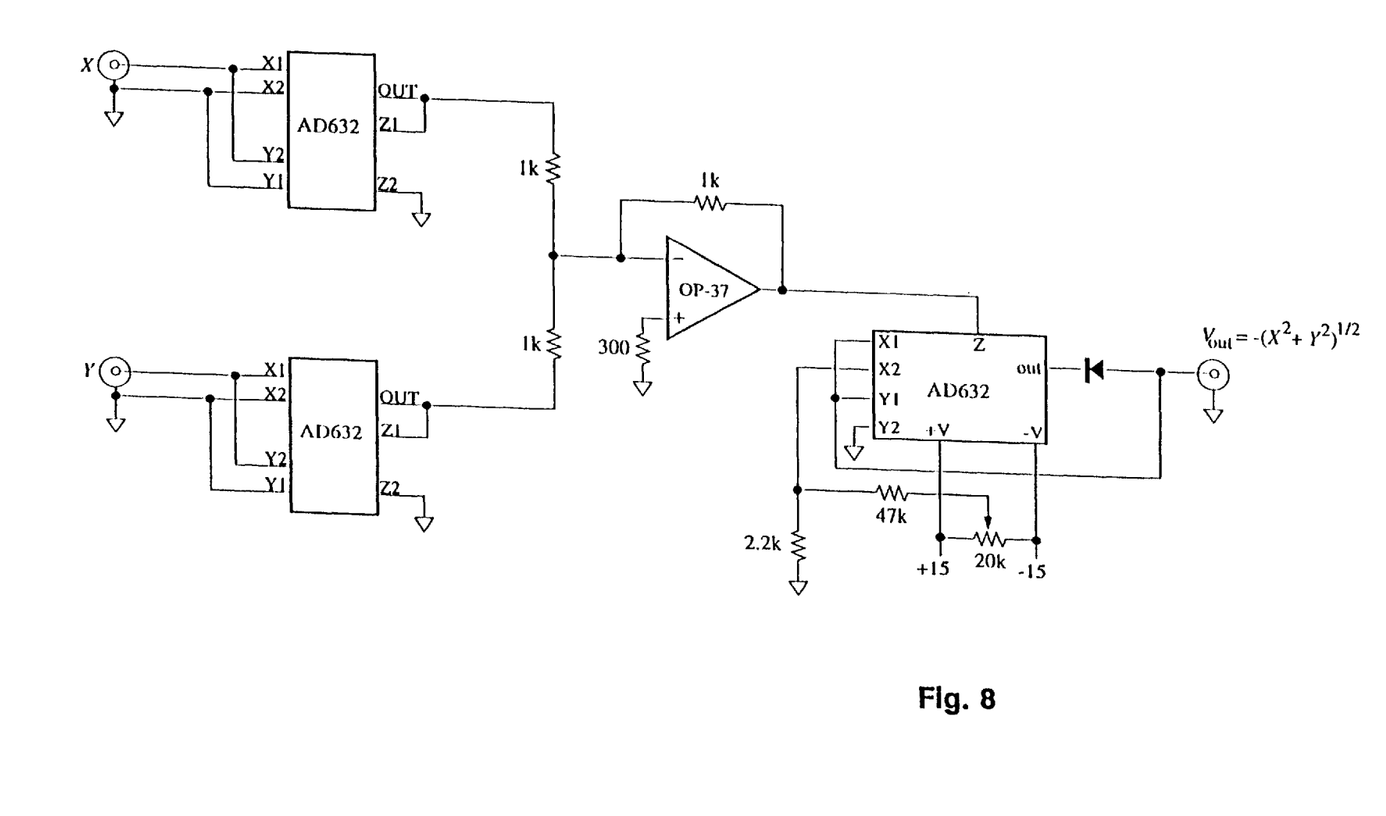
FIG. 8 is a schematic of the wide-bandwidth magnitude conversion circuit using signal polarities chosen to match the requirements of the utilized feedback controller.

To obtain a R signal suitable for feedback, the wide-bandwidth X, Y R converter external to the lock-in shown in detail in FIG. 8, is utilized. The components have been adapted from the manufacturer's standard operations manual, as will be apparent to those skilled in the art. The X and Y signals from the lock-in are squared by the input AD632s, summed by the OP-37, and this sum is then square-rooted by the output AD632. The converters output is linearly proportional to the magnitude of the original bridge signal but is highly insensitive to that signal's phase. The converter output is used as the input to the scanning control electronics for the distance feedback. This magnitude converter essentially makes the lock-in amplifier a true rms meter with better than 1 $\mu$V sensitivity over a measured bandwidth of >10 kHz. The combination of the arbitrary-impedance bridge and the magnitude converter allows tip-to-sample approaches to be accomplished rapidly and reliably without using an optical detection system as an approach guide. The foregoing adaptations are used as an example of one method of obtaining a suitable R signal. Other methods which provide the desired signal feedback can also be incorporated into the disclosed feedback control system.

Figure 9:
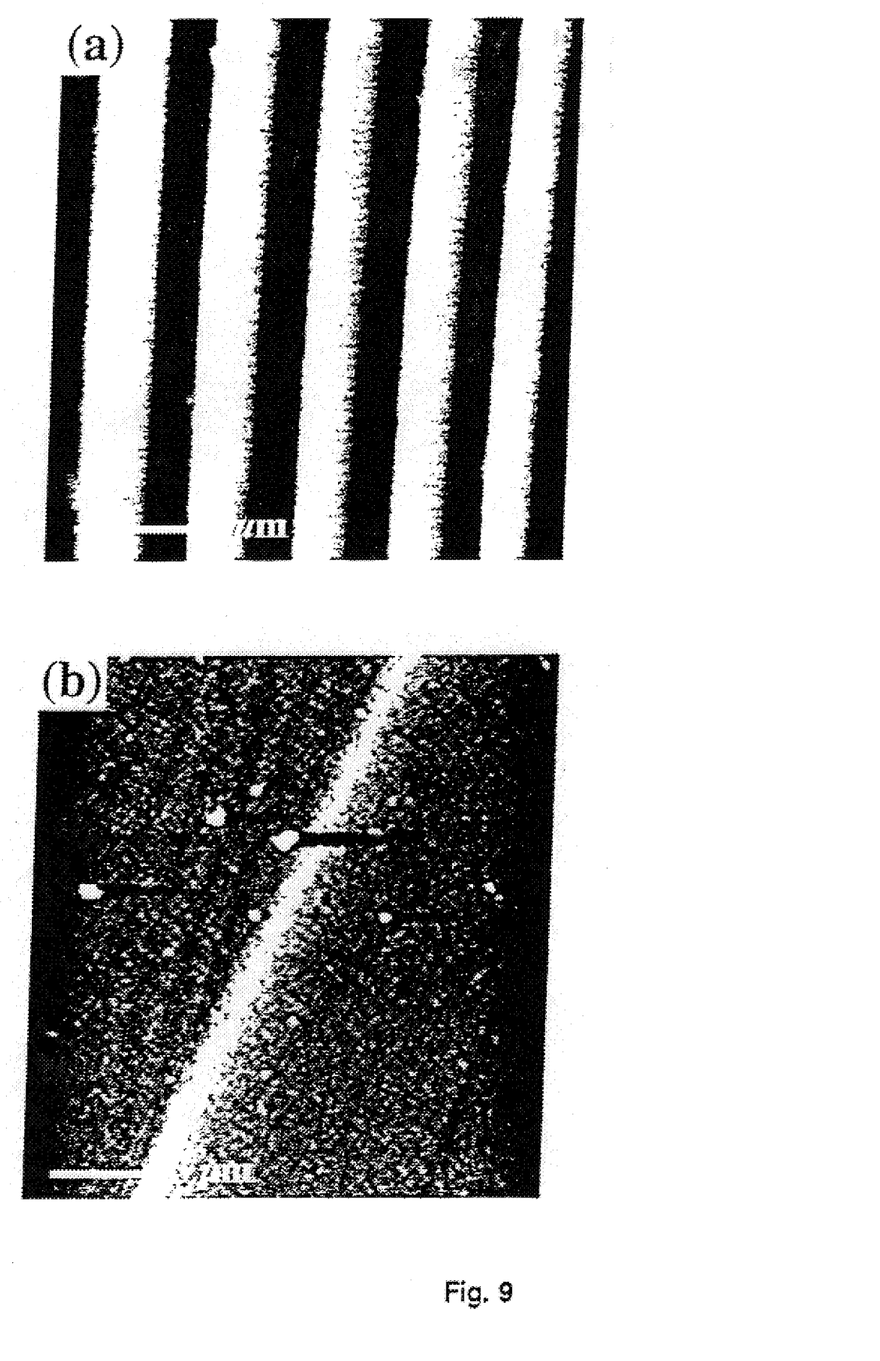
FIG. 9(a) is a topographic image taken with tapered fiber optic tips using the non-optical feedback system shown in FIG. 3 of a 80 nm high, 1 µm period chrome-on-glass grating.
FIG. 9(b) is a topographic image taken with tapered fiber optic tips using the non-optical feedback system shown in FIG. 3 of a polished $LaAlO_3$ crystal. The diagonal ridge in the center of the image is measure to be 7 Å high.

FIG. 9 shows a topographic image of a chrome-on-glass grating with 1 $\mu$m spacing and 80 nm step height taken using the disclosed non-optical, non-contact feedback system. The probe was a tapered NSOM optical fiber tip. This image was taken at a line scan rate of 0.2 Hz with a lock-in time constant of 0.1 ms. Due to the large topographic change of the grating, the fastest line scan rate usable was 0.5 Hz.

To demonstrate the distance sensitivity of the disclosed feedback system, a topographic image of a polished lanthanum aluminate (LaAlO$_3$) single crystal in FIG. 10. The scan size is 16 $\mu$m×16 $\mu$m and the full gray scale represents a height change of 15 Å. The diagonal ridge is measured to be 7 Å high, corresponding to a step of one lattice constant (7.5 Å). For smooth surfaces such as this, a line scan rate of 1 Hz can be used. The rms roughness of a featureless area away from this step was measured to be 0.8 Å. The minimum Z detection, defined ~ by a signal-to-noise ratio of 1, in a small scan area is $\leq 0.5$ Å, which represents the limitation an the distance detection sensitivity in a 1 kHz bandwidth. The two examples shown in FIGS. 9 and 10 clearly demonstrate that this non-optical impedance feedback method has a dynamic range exceeding 60 dB in detection of topographic feature heights.

The technique described herein as implemented for NSOM with fiber optic tips operating in the shear-force mode, the system can also be optimized for non-contact normal-force operation using commercial silicon or silicon nitride cantilevers and bimorphs. A commercial non-contact scanning force microscope was modified to utilize the disclosed nanometer distance regulation. A clear signal was observed when the micro-fabricated silicon cantilever was brought to the surface of the sample. The micro-fabricated cantilever used is commercially available and has a frequency significantly higher than the tapered silica fiber tips used in the shear-force mode. The piezoelectric element of the SFM is a bimorph with a capacitance estimated to be ~1.5 nF. Although the geometry, the cantilevers and the impedance values are dramatically different between the shear-force setup and the commercial SFM instrument, the disclosed invention can be applied with success to both these, as well as other types, of scanning microscopes. The disclosed method can be successfully utilized in hostile environments, such as a vacuum, provide equally accurate results.

Using the dither piezo impedance change as the feedback signal has several advantages over all existing distance control methods for NSOM because (1) it is non-optical, (2) it can be used with non-conducting samples, and (3) it does not require attaching a separate sensor and wires near the end of the fiber tip. Since it is not optical and does not require careful alignment of a feedback laser and photodetector, it can easily be adapted to any situation where mechanical adjustment is difficult to achieve. In addition, there will not be any background photosignal due to the feedback laser. Unlike other non-optical detection methods, the instant invention measures the tip-sample interaction effect on the electrical impedance of the electromechanical system, consisting of the dither piezo and the fiber tip. To measure the impedance change of the dither piezo requires only two wires for the AC voltage; no additional sensing elements or wires are needed. This makes the setup simpler and easier to adapt to different conditions. In addition, since PZT material is used with modest Q there are no inconvenient limitations on bandwidth and scan rate.

The distance sensitivity of this method is at least equal to the optical deflection or scattering methods. It is also comparable to piezoresistive sensors, superior to capacitance sensors, and less sensitive than vacuum electron tunneling.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A method of measuring tip-sample distance in scanning probe microscopy comprising the step of:
    determining the tip-sample distance by measuring the change distance between the tip and sample as related to power dissipation in an electromechanical system composed of a scanning probe tip and a dither piezoelectric member.

2. The method of claim 1, wherein said power dissipation is determined by measuring changes in electric impedance that a dither piezo presents to an oscillator.

3. The method of claim 1 further comprising an electrical bridge in communication with said electromechanical system, said electrical bridge having an output, regulating said tip-sample separation relative to said bridge output.

4. The method of claim 3 wherein said tip-sample separation is regulated with a Wheatstone type bridge.

5. The method of claim 3 wherein said tip-sample separation is regulated by an electronic bridge driving the piezo/tip with an oscillating wave and combining said oscillating wave with a phase-referenced wave of equal amplitude at a 180° phase shift.

6. The method of claim 5, wherein said bridge detects impedance changes of about −100 dB across loads with impedance phases between −90° to +90°.

7. A non-optical method of determining the probe-to-sample distance of an oscillating scanning probe, comprising measuring probe-to-sample interaction by measuring the dampening of probe oscillations as a tip of said probe approaches a sample surface, said interaction increasing as the distance between said probe and said sample decreases.

8. The non-optical method of determining probe-to-sample distance of claim 7, wherein said dampening is measured by changing the probe-to-sample distance of an oscillating scanning probe, and measuring changes in the electro-mechanical power dissipation of said oscillating probe during probe-to-sample distance changes.

9. A scanning probe microscope having a probe-to-sample distance control member, said distance control member comprising a scanning probe tip and oscillator member for oscillating said probe tip, and power dissipation measuring member, said power dissipation measuring member measuring power dissipation in said oscillating member during probe-to-sample distance changes.

10. The scanning probe microscope of claim 9, further comprising a piezo member, said piezo member being affixed to one end of said tip and in electrical communication with said oscillator member, and wherein said power dissipation measuring member is an impedance measuring member, said impedance measuring member measuring changes in electric impedance presented by said piezo member to said oscillator member.

11. The scanning probe microscope of claim 10, and further comprising probe-to-sample distance regulating member, said regulating member being a bridge in communication with, and placed between said piezo member and said oscillator member.

12. The scanning probe microscope of claim 11 wherein said bridge is a Wheatstone type bridge.

* * * * *

UNITED STATES PATENT AND TRADEMARK OFFICE
CERTIFICATE OF CORRECTION

PATENT NO.   : 5,886,532
DATED        : March 23, 1999
INVENTOR(S)  : Hsu et al

It is certified that error appears in the above-identified patent and that said Letters Patent is hereby corrected as shown below:

On the title page, item [75] correct the spelling of second inventor to read -- Deaver--

Signed and Sealed this

Twelfth Day of October, 1999

Attest:

Q. TODD DICKINSON

*Attesting Officer*  *Acting Commissioner of Patents and Trademarks*